(12) United States Patent
Kerns et al.

(10) Patent No.: US 10,072,875 B2
(45) Date of Patent: Sep. 11, 2018

(54) HEAT CONCENTRATOR DEVICE FOR SOLAR POWER SYSTEM

(71) Applicant: Sol-Electrica, LLC, Worthington, IN (US)

(72) Inventors: Gary R. Kerns, Worthington, IN (US); Bret M Lee, Worthington, IN (US)

(73) Assignee: SOL-ELECTRICA, LLC, Worthington, IN (US)

( * ) Notice: Subject to any disclaimer, the term of this patent is extended or adjusted under 35 U.S.C. 154(b) by 284 days.

(21) Appl. No.: 14/994,318

(22) Filed: Jan. 13, 2016

(65) Prior Publication Data

US 2016/0123628 A1    May 5, 2016

Related U.S. Application Data

(60) Division of application No. 14/262,773, filed on Apr. 27, 2014, now Pat. No. 9,279,417, which is a
(Continued)

(51) Int. Cl.
  *F24S 23/71* (2018.01)
  *F03G 6/06* (2006.01)
  (Continued)

(52) U.S. Cl.
  CPC ............... *F24S 23/71* (2018.05); *B23P 15/26* (2013.01); *F01D 1/36* (2013.01); *F03G 6/065* (2013.01); *F24S 10/45* (2018.05); *F24S 10/748* (2018.05); *F24S 10/80* (2018.05); *F24S 20/20* (2018.05); *F24S 20/25* (2018.05); *F24S 23/70* (2018.05); *F24S 23/79* (2018.05); *F24S 60/00* (2018.05); *F24S 80/30* (2018.05); *F24S 80/54* (2018.05);
(Continued)

(58) Field of Classification Search
  CPC .. F24J 2/07; F24J 2/18; F24J 2002/075; F24J 2/06; F24J 2/08; F24J 2/34; Y02E 10/41; Y02E 10/46; Y02E 10/44; F02G 2254/30
  See application file for complete search history.

(56) References Cited

U.S. PATENT DOCUMENTS

| | | |
|---|---|---|
| 1,061,206 A | 5/1913 | Tesla |
| 2,864,879 A | 12/1958 | Toulmin |

(Continued)

*Primary Examiner* — Mark Laurenzi
*Assistant Examiner* — Wesley Harris
(74) *Attorney, Agent, or Firm* — Myers & Associates; Michael A. Myers

(57) ABSTRACT

A heat concentrator device for a solar power system includes an evacuated hollow body with a bottom, side walls, a top and an airtight cap. Portions of the side walls have inwardly reflective surfaces for concentrating solar radiation into the chamber toward a heat sink, which is positioned in the bottom of the chamber. The heat sink also is hollow and has an inlet port formed in one of its opposite side walls and an outlet port formed in the other for heat transfer fluid to flow into and out of the heat sink. Circuitous passageways form a maze that connects the inlet and outlet ports thus maximizing heat transfer to/from system fluid(s) within the heat sink. The sidewalls of the chamber of the device extend below the heat sink to form a partial vacuum chamber between its bottom and the heat sink. The device is mounted to a reflective dish of a solar power system in a unique way adding additional solar energy collection efficiencies.

12 Claims, 13 Drawing Sheets

Related U.S. Application Data continuation-in-part of application No. 13/871,365, filed on Apr. 26, 2013, now Pat. No. 9,279,416.

(51) Int. Cl.

| | | |
|---|---|---|
| *F01D 1/36* | (2006.01) | |
| *F24S 23/70* | (2018.01) | |
| *F24S 10/80* | (2018.01) | |
| *F24S 60/00* | (2018.01) | |
| *F24S 80/30* | (2018.01) | |
| *B23P 15/26* | (2006.01) | |
| *F24S 20/25* | (2018.01) | |
| *F24S 20/20* | (2018.01) | |
| *F24S 80/54* | (2018.01) | |
| *F24S 10/70* | (2018.01) | |
| *F24S 23/79* | (2018.01) | |
| *F24S 10/40* | (2018.01) | |
| *F24S 80/00* | (2018.01) | |

(52) U.S. Cl.
CPC ....... *F02G 2254/30* (2013.01); *F24S 2080/03* (2018.05); *Y02E 10/41* (2013.01); *Y02E 10/42* (2013.01); *Y02E 10/44* (2013.01); *Y02E 10/46* (2013.01)

(56) References Cited

U.S. PATENT DOCUMENTS

| | | | |
|---|---|---|---|
| RE25,242 E | 9/1962 | Toulmin | |
| 3,985,118 A | 10/1976 | Bard | |
| 3,993,041 A | 11/1976 | Diggs | |
| 4,000,733 A | 1/1977 | Pauly | |
| 4,010,732 A | 3/1977 | Sawata et al. | |
| 4,068,474 A | 1/1978 | Dimitroff | |
| 4,144,875 A | 3/1979 | Bruno et al. | |
| 4,249,083 A | 2/1981 | Bitterly | |
| 4,265,223 A | 5/1981 | Miserlis et al. | |
| 4,280,328 A | 7/1981 | Falconer | |
| 4,308,857 A * | 1/1982 | Sims | F24J 2/055 |
| | | | 126/652 |
| 4,655,679 A | 4/1987 | Giacomel | |
| 4,977,744 A | 12/1990 | Lenz | |
| 5,404,723 A * | 4/1995 | Parker | F02G 1/0435 |
| | | | 126/654 |
| 6,000,211 A | 12/1999 | Bellac et al. | |
| 6,250,071 B1 | 6/2001 | Schmoll | |
| 6,623,241 B2 | 9/2003 | Blangetti et al. | |
| 6,824,357 B2 | 11/2004 | Stanzel | |
| 6,973,792 B2 | 12/2005 | Hicks | |
| 7,341,424 B2 | 3/2008 | Dial | |
| 8,341,961 B2 | 1/2013 | Glynn | |
| 2008/0206041 A1 | 8/2008 | Adamietz et al. | |
| 2009/0320830 A1 | 12/2009 | Bennett | |
| 2011/0290235 A1 | 12/2011 | NewDelman | |
| 2012/0124999 A1 | 5/2012 | Gruss et al. | |

* cited by examiner

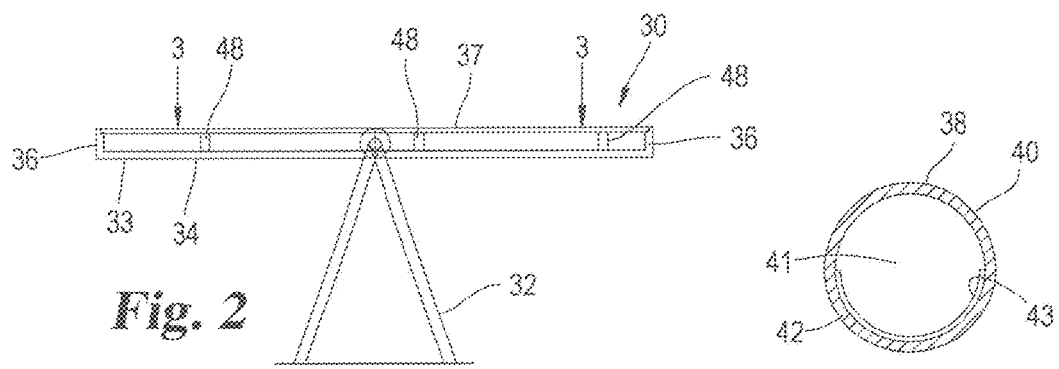
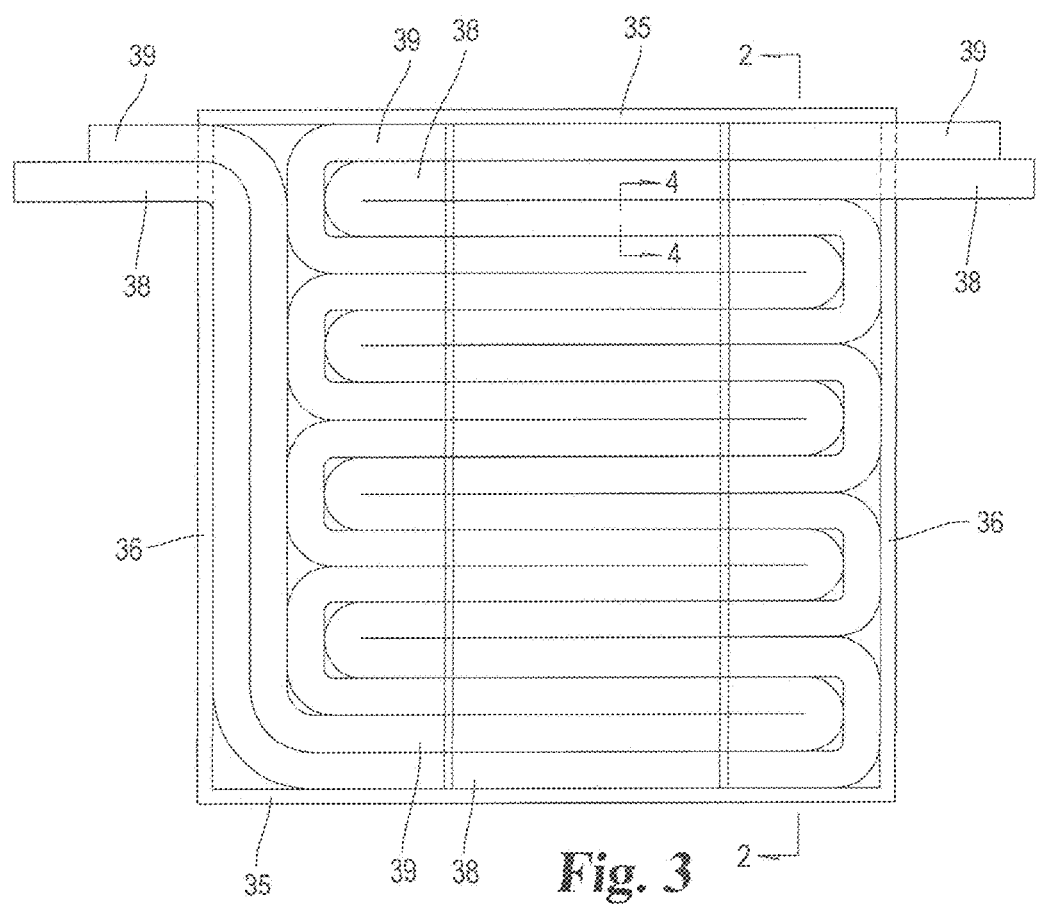

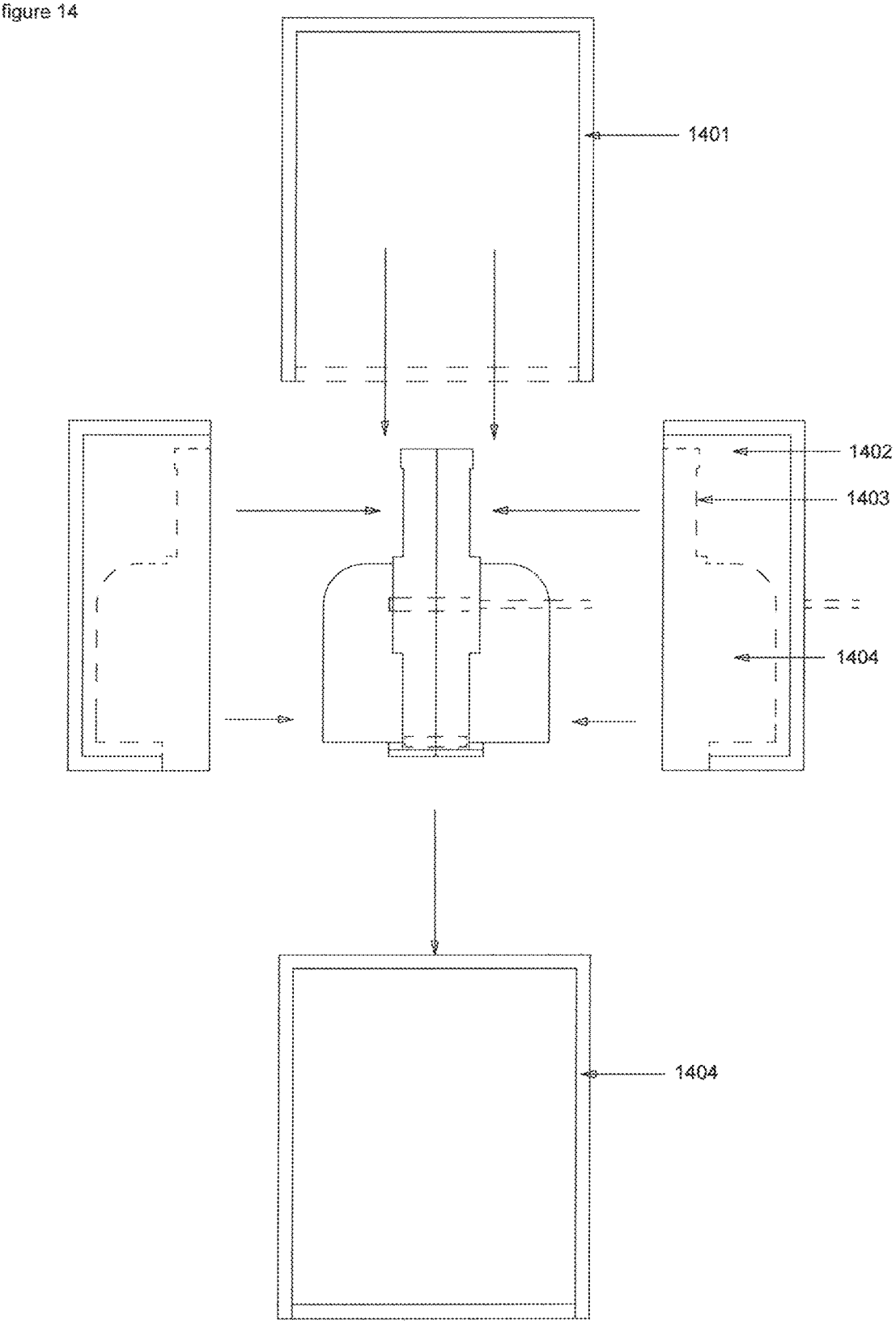

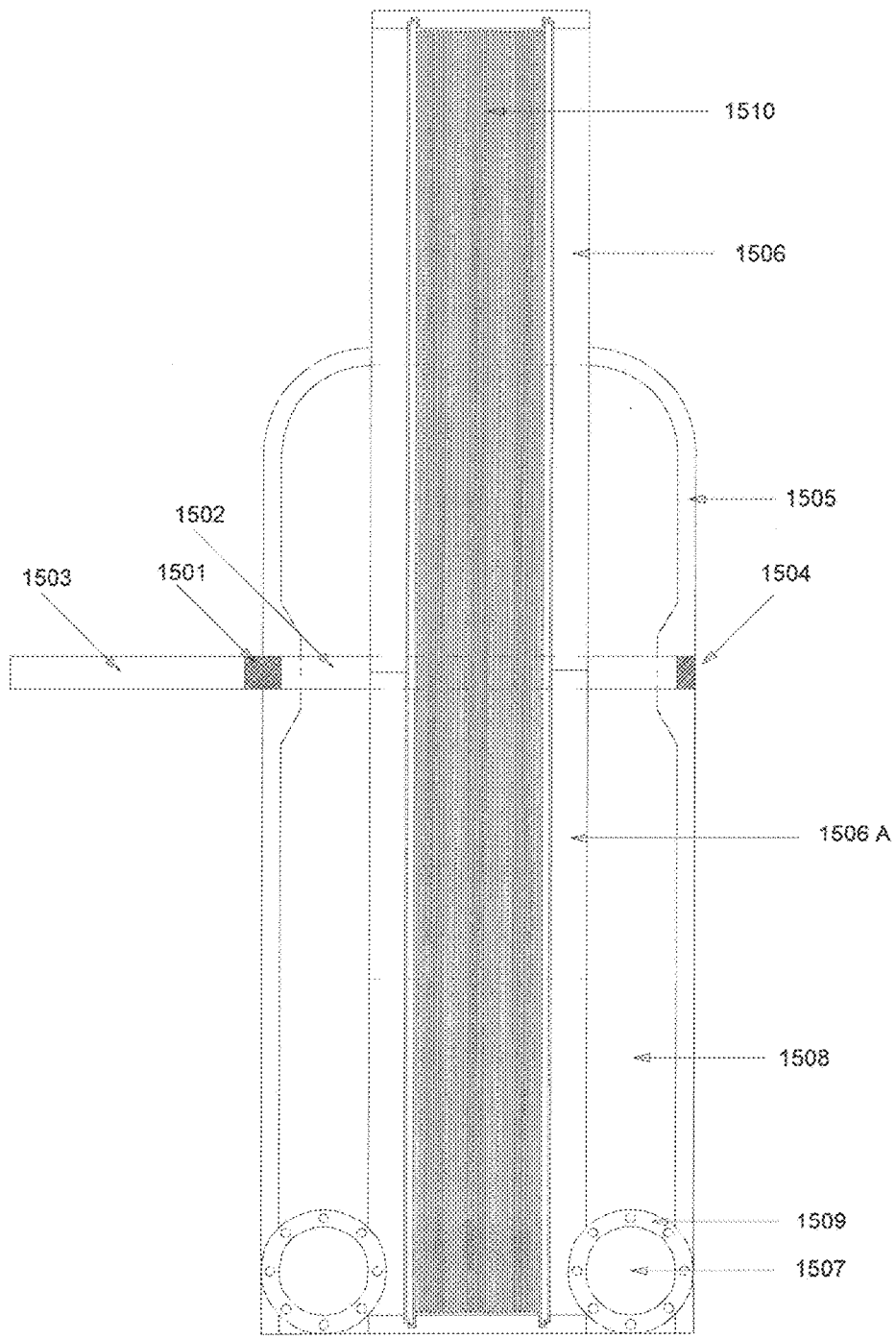
Figure 15  Single Modular Turbine Unit

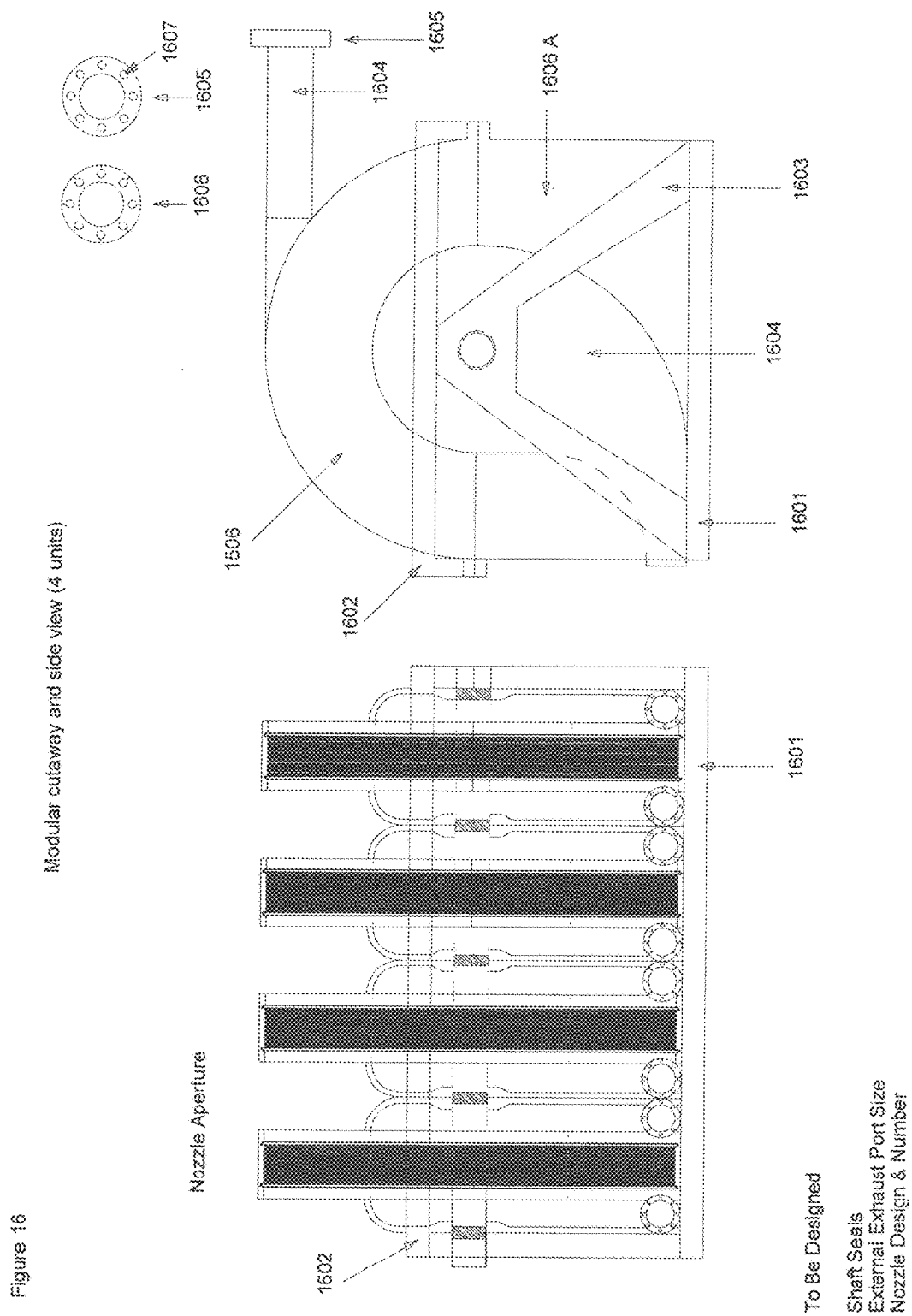

HEAT CONCENTRATOR DEVICE FOR SOLAR POWER SYSTEM

REFERENCE TO RELATED APPLICATION

This application is a divisional application of, and claims priority to, U.S. application Ser. No. 14/262,773, filed Apr. 27, 2014, which is a continuation-in-part of and claims priority to U.S. application Ser. No. 13/871,365, filed Apr. 26, 2013, each of which is hereby incorporated by reference.

BACKGROUND OF THE INVENTION

Field of the Invention

The present invention relates generally to the field of system for converting solar energy into mechanical or electrical energy.

Description of Related Art

Increased emphasis has been placed on systems for converting solar energy into mechanical and/or electrical energy due to increased energy demand and the scarcity of certain natural resources. A variety of systems have been employed with many including solar collectors connected via a fluid system to a boiler, in turn connected to various components for producing mechanical and/or electrical energy.

It is known to collect solar energy by a parabolic reflector and then direct the energy through a lens system with the resultant heat energy directed onto a head of a conductor having a bottom end extending into a reservoir of water. Steam is thereby created in the reservoir and used to power a turbine. The resulting mechanical energy from the turbine may be used to generate electrical energy. Such an approach is discussed in U.S. Pat. No. 4,068,474 issued to Dimitroff.

Further, with respect to the parabolic reflector, the most commonly used means for collecting solar radiation for the production of electricity includes the parabolic trough (A) and parabolic dish (B) designs illustrated in FIG. 10. Both types of collection designs focus the sun's rays into a central focal point thus concentrating the solar radiation into a HTF tube, which transports the heat into a central heat storage unit or a solar absorber. New designs for concentrating solar radiation into the center of the main parabolic dish have been proposed. One such design, which is shown at (C) of FIG. 10, includes a parabolic collector and its counterpart hyper-parabolic concentrator with a pure parabolic curve 1001, a rear offset focal point from the main parabolic collector 1004, an inward parabolic central focal point from the concentrator 1002, and a raised plane collection point 1003.

In Patent Application Publication US 2012/0121999 of Gruss et al, there is disclosed a low temperature power plant including a tubular solar collector comprising an outer tube containing a vacuum and an inner tube. A plurality of the solar collectors are used to direct heat energy to a heat transfer fluid for powering a boiler and a turbine coupled to an electric generator.

U.S. Pat. No. 4,000,733 issued to Pauly discloses a solar furnace receiving reflected solar energy from a battery of positionable mirrors with the furnace having reflectors directing concentrated radiant energy towards a Fresnel lens.

U.S. Pat. No. 6,000,211 issued Bellac et al. discloses a combustion turbine power plant wherein air is cooled using solar energy and supplied to the air inlet of the power plant to support combustion. Further, the patent discloses combustion turbine power plants in which steam is produced using the solar energy and ejected into a turbine of the power plant.

U.S. Pat. No. 3,985,118 issued to Bard discloses a solar furnace wherein a plurality of Fresnel lenses focus light rays upon heat conductors. Fluid passing through an associated vessel, it is used to provide steam for a steam turbine associated with an electrical generator.

U.S. Patent Application Publication 201110290235 of New Delman discloses an evacuated solar conductor having a cavity positioned between a top casing that is partially transparent and a bottom portion forming a heat sink. Solar energy is transmitted through the transparent top casing to the heat sink portion.

In the U.S. Pat. No. 3,993,041 issued to Diggs, there is disclosed a solar energized steam generator system wherein a lens is used for collecting and concentrating solar energy along with reflector funnel for enhancing and concentrating the solar energy. The funnel is connected by means of a conduit to an insulated vault. An air duct operatively connected to the vault is in a heat exchange relationship with a steam generator.

U.S. Pat. No. 8,341,961 discloses a solar desalination system wherein a hydroturbine is connected to a steam turbine condenser for the purpose of generating desalinated water.

U.S. Pat. No. 1,061,206 discloses an example of a bladeless turbine and is herewith incorporated by reference on the structure of one such turbine.

SUMMARY OF THE INVENTION

One embodiment of the present invention is a solar power system for converting solar radiation into mechanical and electrical energy. The solar power system includes a preheater with a first tube to hold a first heat transfer fluid and a second tube to hold a second heat transfer fluid. The first tube and the second tube have side walls allowing solar radiation to flow inwardly through the side walls and preheat the first heat transfer fluid and second heat transfer fluid but limit flow of radiation outwardly there from. A combination collector and concentrator has a vacuum chamber containing an internal heat sink with a circuitous passage. The collector and concentrator collects solar radiation and concentrates energy via the vacuum chamber into the heat sink. A first heat transfer fluid conduit extends to and between the first tube and the heat sink routing the first heat transfer fluid through the circuitous passage of the heat sink to allow heat in the heat sink to be absorbed by the first heat transfer fluid in the first conduit. The heated first heat transfer fluid is then directed to a boiler heating the second heat transfer fluid within boiler. A turbine is connected to a steam output of the boiler and is operable to convert energy into a mechanical output. An alternator is operable to convert the mechanical output of the turbine into electrical energy.

In another aspect of the invention, a heat concentrator device for a solar power system includes a hollow body having a bottom, a top and side walls connecting the bottom and the top to define an interior chamber. An airtight cap is secured to the top of the body. A heat sink is positioned within the chamber. The heat sink has a hollow interior with opposite side walls, an inlet port formed in one of the opposite side walls and an outlet port formed in the other for fluid to flow into and out of the heat sink.

In yet another aspect, a method is provided of connecting a heat concentrator device to a reflective dish for a solar power system. The method includes the steps of: (i) providing a heat concentrator device, the heat concentrator device includes a hollow body with a bottom, a top and side walls connecting the bottom and the top to define an interior chamber. A portion of the sidewalls of the chamber has reflective surfaces facing into the chamber; (ii) positioning a heat sink within the chamber. The heat sink has a hollow interior with opposite side walls, an inlet port formed in one of the opposite side walls and an outlet port formed in the other so that fluid can flow into and out of the heat sink; (iii) coupling tubes to the inlet and outlet ports of the heat sink to connect the heat sink with at least one heat transfer fluid system; (iv) securing an airtight cap to the top of the heat concentrator; (v) providing a reflective dish with an upper surface. The dish is adapted to be capable of operably connecting to a solar power system; and (vi) mounting the heat concentrator device to the dish so that the portion of the side walls of the chamber having the inwardly facing reflective surfaces are above the upper surface of the dish and the remaining portion of the side walls of the chamber are below the surface of the dish.

It is an object of the present invention to collect, concentrate and convert solar radiation into heat, which is then transferred to a fluid for use in powering a heat engine.

It is an object of the present invention to provide a new and improved solar power system for converting solar radiation into mechanical and/or electrical energy.

Related objects and advantages of the present invention will be apparent from the following description.

BRIEF DESCRIPTION OF THE DRAWINGS

FIG. 2 is a side view of the solar panel shown in FIG. 1 pivotally mounted atop a base.

FIG. 3 is an enlarged top view of the solar panel shown in FIG. 1 and FIG. 2.

FIG. 4 is an enlarged cross-sectional view taken along a line and viewed in the direction of arrows 4-4 of FIG. 3 illustrating the construction of a fluid conveying tube.

FIG. 14 is an enlarged view of a heat capture and noise reduction enclosure for the system turbine.

FIG. 15 is a vertical cutaway view of a single modular boundary layer turbine.

FIG. 16 shows a vertical cutaway view and a side view of multiple modular boundary layer turbines.

DETAILED DESCRIPTION OF INVENTION

Figure 1:
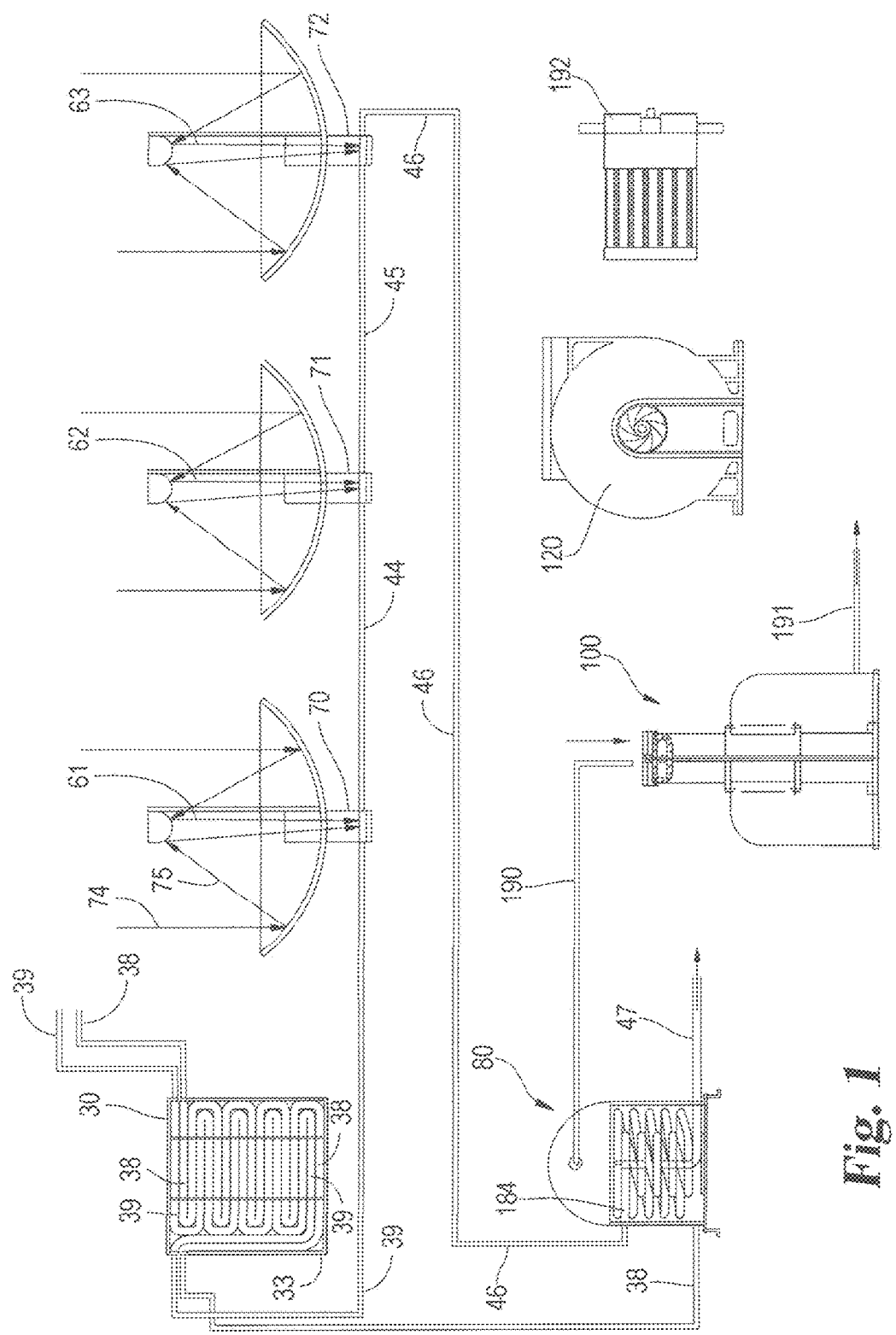
FIG. 1 is a schematic flow diagram illustrating the major components of the solar power system.

For the purposes of promoting an understanding of the principles of the invention, specific embodiments have been described. It should nevertheless be understood that the description is intended to be illustrative and not restrictive in character, and that no limitation of the scope of the invention is intended. Any alterations and further modifications in the described components, elements, processes, or devices, and any further applications of the principles of the invention as described herein, are contemplated as would normally occur to one skilled in the art to which the invention relates.

The solar power system begins with the preheating of two heat transfer fluids. At the beginning of a day's cycle the sun's radiation penetrates the transmissive front of a dual heat transfer fluid preheating modular tracking panel 30 (FIG. 1) and travels through the partial vacuum which is enclosed in housing 33 that also contains transmissive glass tubes 38 and 39 (FIG. 3). The tubes have copper inner lining 43 (FIG. 4) that act as a heat sink to further capture and radiate the fullest amount of solar energy and prevent the loss of radiation through the back portion 42 (FIG. 4) of the internal high pressure tubing 38 and 39. Panel 30 is a dual preheating device that allows the fullest amount of solar radiation to excite and heat fluids circulated through tubes 38 and 39 by remaining nearly perpendicular to the sun's rays during morning hours of each daily cycle. Since both fluids are in a closed loop, the pressure within the tubes builds during the preheating process and thus the need for very high pressure resistant transmissive tubing. For example, 100 atmospheres or more may be obtained during peak performance of the complete system at maximum thermal capacity.

The flow of each fluid remains stagnant until the proper temperature and saturated steam psig is reached in the micro-boiler 80 (FIG. 1) for the system to begin normal operations. Once at operation temperature, circulation valves are open and pumps begin circulating the fluids through the complete system. Pumps are used to circulate the second heat transfer fluid in tube 38 and the first heat transfer fluid in tube 39 through the system and back to panel 30. The heat transfer fluid circulated through tube 39 is in the preferred embodiment is a gas, whereas the fluid circulated through tube 38 is a liquid, such as water. It is to be understood that the present invention includes fluids circulated through tubes 38 and 39, such as a gas in tube 39 and a liquid in tube 38 so long as the fluid circulated through tube 38 when boiled turns to steam or gas to drive the turbine connected to the boiler. The liquid circulated through tube 38 may therefore be referred to as a boiler turbine fluid and is dissimilar from the heat transfer fluid circulated through tube 39. The fluid circulated through tube 38 is pumped from panel 30 directly into micro-boiler 80. The first heat transfer fluid, for example pressurized helium, is pumped through tube 39 from panel 30 and then through heat sinks attached to a plurality of collector concentrators 61-63 (FIG. 1) gaining heat through each pass through heat sinks. The first heat transfer fluid is then pumped into coils within the boiler 80 to heat the second heat transfer fluid to a predetermined operational psig. In the embodiment shown in FIG. 1, there are three collector concentrators connected together in series thereby comprising collector concentrator 61, 62 and 63. Less than three or more than three collector concentrators are included in the present invention depending upon the amount of heat desired to heat the first heat transfer fluid circulated through the system to the micro-boiler. The power system is thus scalable with respect to the collector concentrator(s) and other of the system's components.

Each collector concentrator during normal operation track the sun's daily path and collect and concentrate the full spectrum radiation into a vacuum chamber and heat sink in order to transfer the heat into the first heat transfer fluid that is traveling through the thermally insulated device.

Once both the second and first heat transfer fluids circulated through the system reach the desired temperature and the desired pressure inside the micro-boiler is obtained, a saturated steam valve is open and the steam or fluid exits the micro-boiler and routed to the blades or discs of turbine 100. The rotatable output of turbine 100 is connected to a gear system, such as an epicyclic gear mechanism 120 (FIG. 1), in turn, connected to alternator 190 to begin producing electric current. The turbine remains operational from a predetermined RPM range output through the entire daily sunlight cycle.

Referring now more particularly to FIGS. 2-4, tracking panel 30 includes a rectangular shape solar housing 33 pivotally mounted atop base 32. Housing 33 includes a rigid box shape construction with a bottom wall 34 joined to a pair of end walls 35 and a pair of side walls 36. The top wall 37 is mounted to the end walls and side walls thereby forming an enclosure in which tubes 38 and 39 extend back and forth between the side walls 36 in a side by side relationship along the length of housing 33 between the opposite end walls 35. In the preferred embodiment, top wall 37 is produced from a glass to allow the sun rays to penetrate whereas walls 34 and 36 are produced from metal. The resultant enclosure formed by walls 34-37 is a vacuum or at least partial vacuum enclosure through which tubes 38 and 39 extend. In order to provide structural rigidity for glass wall 37 a plurality of strengthening spacers 48 are provided extending from bottom wall 34 toward and against top wall 37. Spacers 48 (FIG. 2) are rigid and may take many different shapes and forms. For example, in the preferred embodiment spacers 48 are pins. In order to provide adequate space for spacers 48 to extend between walls 34 and 37, tubes 38 and 39 may be slightly spaced apart to accommodate the pins.

The main purpose of the solar panel 30 is to preheat the fluids within each tube 39 and 38 prior to entering respectively the heat sinks of the collector/concentrators 61-63 (FIG. 1) and the micro-boiler 80. Both the first heat transfer fluid circulated in tube 39 and the liquid, such as water, circulated through tube 38 are in a closed loop system and enter one end of panel 30 adjacent one of the side walls and then exit through the same tube on the opposite side of panel 30. Tubes 38 and 39 are placed beneath and adjacent top wall 37 which is produced from a highly sunlight transmissive material, such as glass. The remaining walls of housing 33 are opaque to the passage of solar radiation. Top wall 37 remains perpendicular to the sun's radiation by a two axis tracking device. Axis solar tracking devices are commercially available. For example, a slew drive solar tracker is available from SAT Control, Pozenik 10, 4207 CERKL JE, SLOVENIA.

Tube 38 (FIG. 4) will now be described it being understood that an identical description applies to tube 39. Tube 38 has a top portion 40 and a bottom 42 formed in one integral piece forming an interior passage 41 for the second heat transfer fluid to flow there through. Top portion 40 has side walls allowing the solar radiation to pass therethrough and preheat the second heat transfer fluid in the tube. A copper sleeve heat sink 43 is positioned inside passage 41 adjacent the interior surface of bottom portion 42 preventing the sun radiation from passing directly through the internal high pressure tube and hitting the bottom wall 34 of housing 33 to be lost or scattered or unabsorbed radiation. The copper sleeve also acts as an internal heat sink and continues to heat the second heat transfer fluid circulated through tube 38 during normal daylight operations.

Tube 39 is identically constructed as described for tube 38 with the exception that tube 38 is designed to be functional at 150 psig which is the hot water pressure achieved during peak operational periods whereas the borosilicate glass tube 39 is designed to be functional at 1500 psig if the fluid circulated through tube 39 is helium with 1000 lambda thermal conductivity at 100 atmospheres.

Each tube 38 and 39 enter one of the side walls 36 of housing 33 and then extends across the width of the housing between the side walls in a back and forth or serpentine fashion from one end wall 35 to the opposite end wall 35 until eventually both tubes 38 and 39 exit the opposite side wall 36.

Housing 36 is sealed and is partially evacuated containing less air than the air surrounding the panel. Tubes 38 and 39 are sealed thereby separating the first and second heat transfer fluids from the internal air, if any, within housing 33. Each high pressure transmissive tube 38 and 39 inside housing 33 is composed of straight portions and requires a connector to achieve 90 and 180 angle turns within the enclosure before exiting the other side. Both the side entrance of each tube into the housing and the side exit of each tube are aligned so that modularity can be achieved if additional panels are needed for scaled systems. Internal separators 48 within the housing hold the high pressure tubes away from all internal surfaces of the interior of the panel that also help to reduce the tendency of the transmissive glass sheet 37 from warping towards the interior due to the partial vacuum.

Collector concentrator 61 will now be described it being understood that an identical description applies to collector concentrator 62 and 63. A solar thermal vacuum chamber and heat sink are mounted to and beneath a dish 67. Thus, heat sink 70, 71 and 72 are mounted, respectively, to the dishes of collector concentrators 61, 62 and 63. Heat sink 70 will now be described it being understood that an identical description applies to heat sinks 71 and 72 (FIG. 1).

Figure 5:
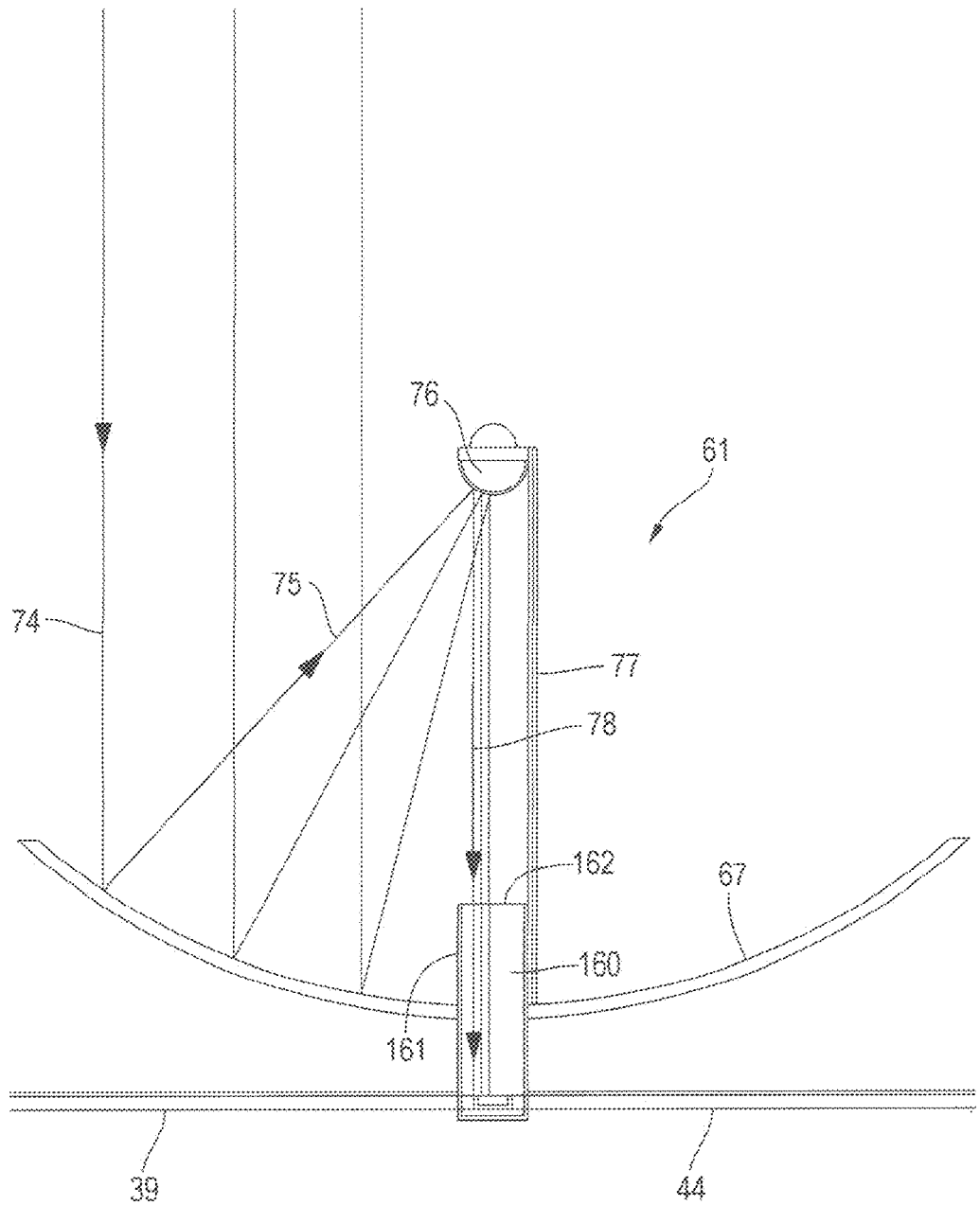
FIG. 5 is an enlarged view of the collector/concentrator illustrated in FIG. 1.
Figure 6:
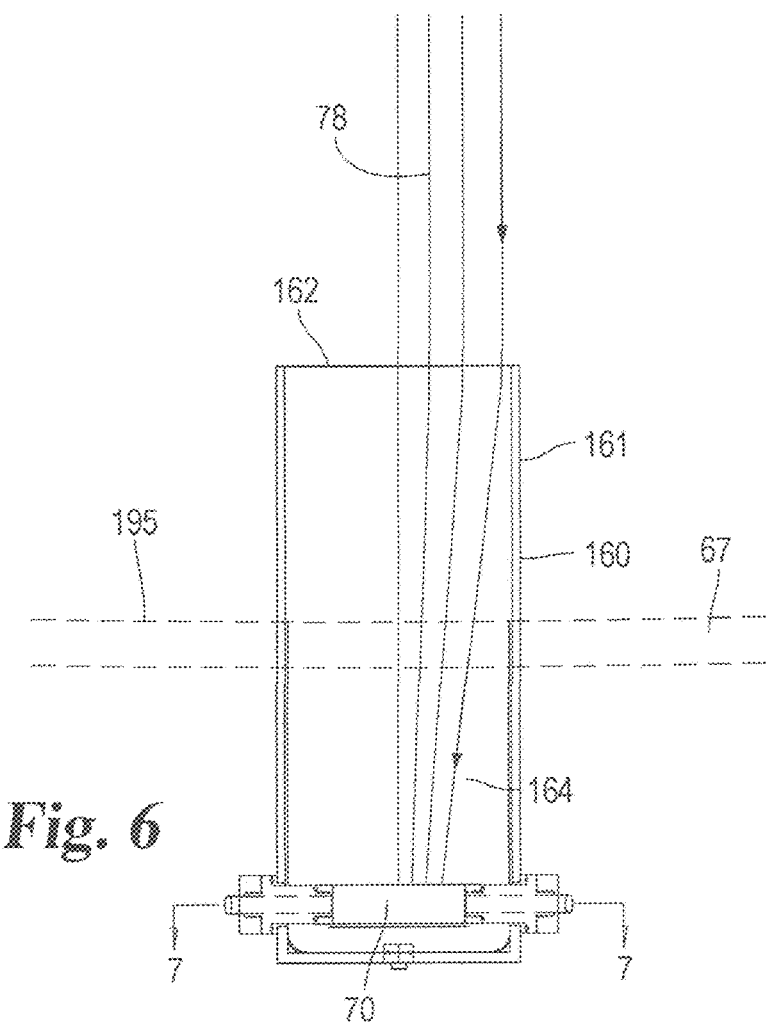
FIG. 6 is an enlarged cross sectional view of the vacuum chamber with a heat sink shown mounted to the dish of FIG. 5.

The main purpose of the solar collector and concentrators 61-63 including the associated solar thermal vacuum chambers and heat sinks is to convert the sun's radiation into usable heat energy. The design of the collector and concentrator 61 is such that nearly 90%+ of the sun's radiation is focused into the vacuum chamber 160 (FIG. 5). The design of the solar thermal vacuum is such that nearly all of the captured solar radiation is converted into heat energy without radiant or reflective loss. All of the converted solar radiation is contained in the internal heat sink 70 (FIG. 6). In the beginning of each sunlight day, the vacuum chamber 160 turns toward the rising sun so that the main axis of the parabolic dish 67 is positioned to receive the sun's rays. The vacuum chamber 160 is positioned parallel to the sun's rays 74 by the use of a conventional solar tracking system which connects to the underside of the main parabolic dish through three tracks and slew drive positioners.

The sun's rays hit the parabolic dish 67 and reflect off the highly reflective surface of the top side or sun side of the dish. In one embodiment, the reflected light rays 75 are then directed towards a raised hyper parabolic concentrator 76 (Cassagrain design) or a conflex or a convex reflective concentrator (Gregorian design). The concentrated rays 78 are focused into the transmissive top 162 of chamber 160. The sun's rays 74 are collected by dish 67 (FIG. 5) resulting in reflective rays 75 directed upwardly to an ellipsoid concentrator 76 which, in turn, directs the rays 78 downwardly to vacuum chamber 160.

Figure 11:
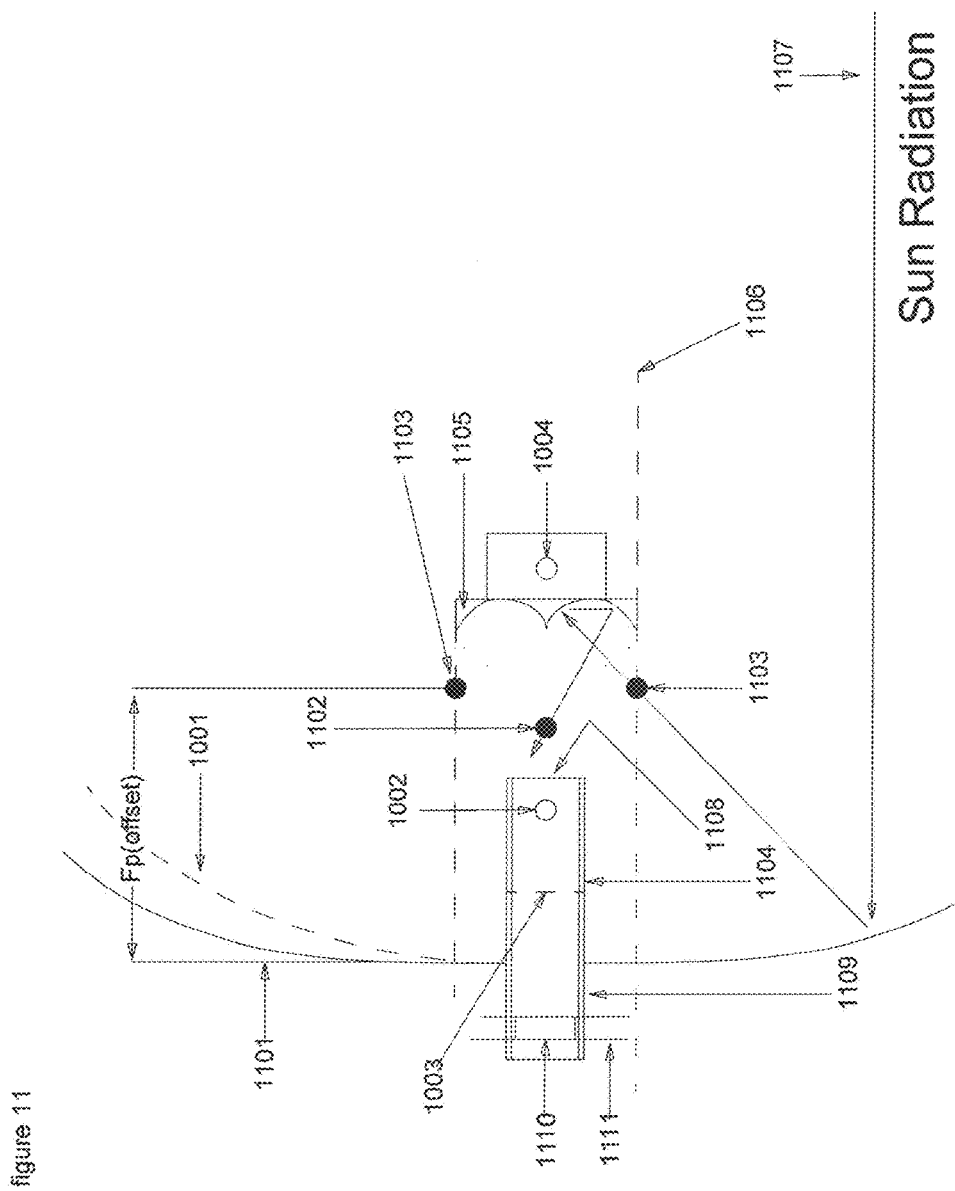
FIG. 11 is a diagrammatic cross-sectional view of the outward receded parabolic collection dish of the invention showing its characteristic ringed focal area and the forward-facing hyperparabolic concentrator.

In another embodiment, the collector concentrator(s) dish design includes an outward receded parabolic main collection dish with a ringed focal point and a forward facing dual parabolic concentrator, as shown in FIG. 11. In that embodiment, the main parabolic dish is not a pure parabola. The outer surface 1101 of the dish is receded by incremental degrees from the pure parabolic surface 1001. This change is contrary to previous designs that have a single central focal point 1004 to a ringed inwardly positioned focal area 1103 increasing the overall gain of the antennae design. The hyperparabolic concentrator's focal point 1002 is located backwards closer to the new forward facing dual parabolic design 1102. This design reduces the spillover from the main collector dish's focused solar radiation to the concentrator 1105. As described in detail below, the vacuum chamber heat sink and HTF gas/fluid flow apparatus (FIG. 13) is elongated to match this unique backward positioned focal point design of the collector concentrator.

Strut 77 is connected to concentrator 76 and dish 67 and supports the concentrator. It has been determined that the support strut prevents harmonic vibrations from occurring in any given wind environment if irregular holes are drilled through the entire strut along the length thereof.

Figure 9:
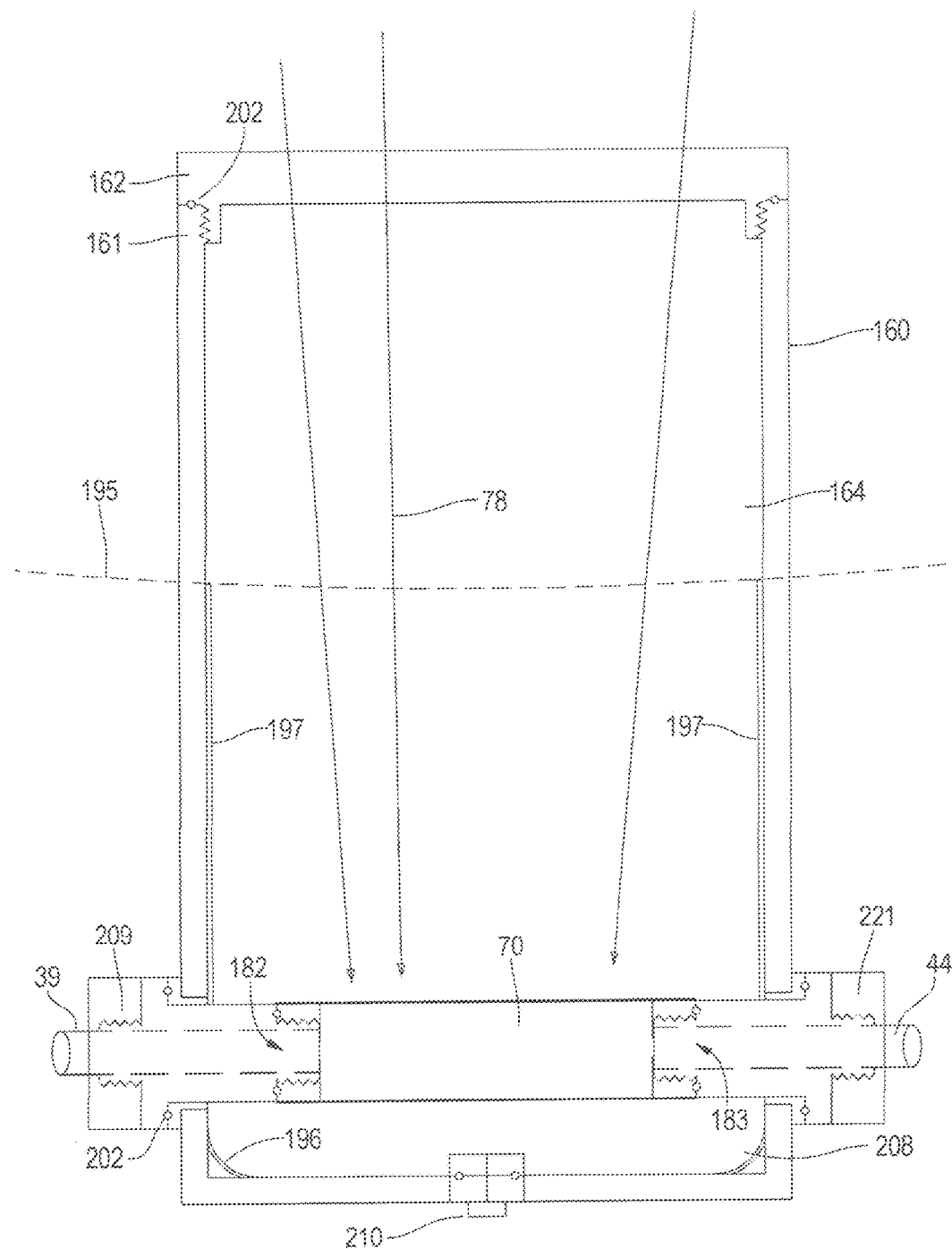
FIG. 9 is an enlarged cross-sectional view of the vacuum chamber with heat sink of FIG. 5.
Figure 10:
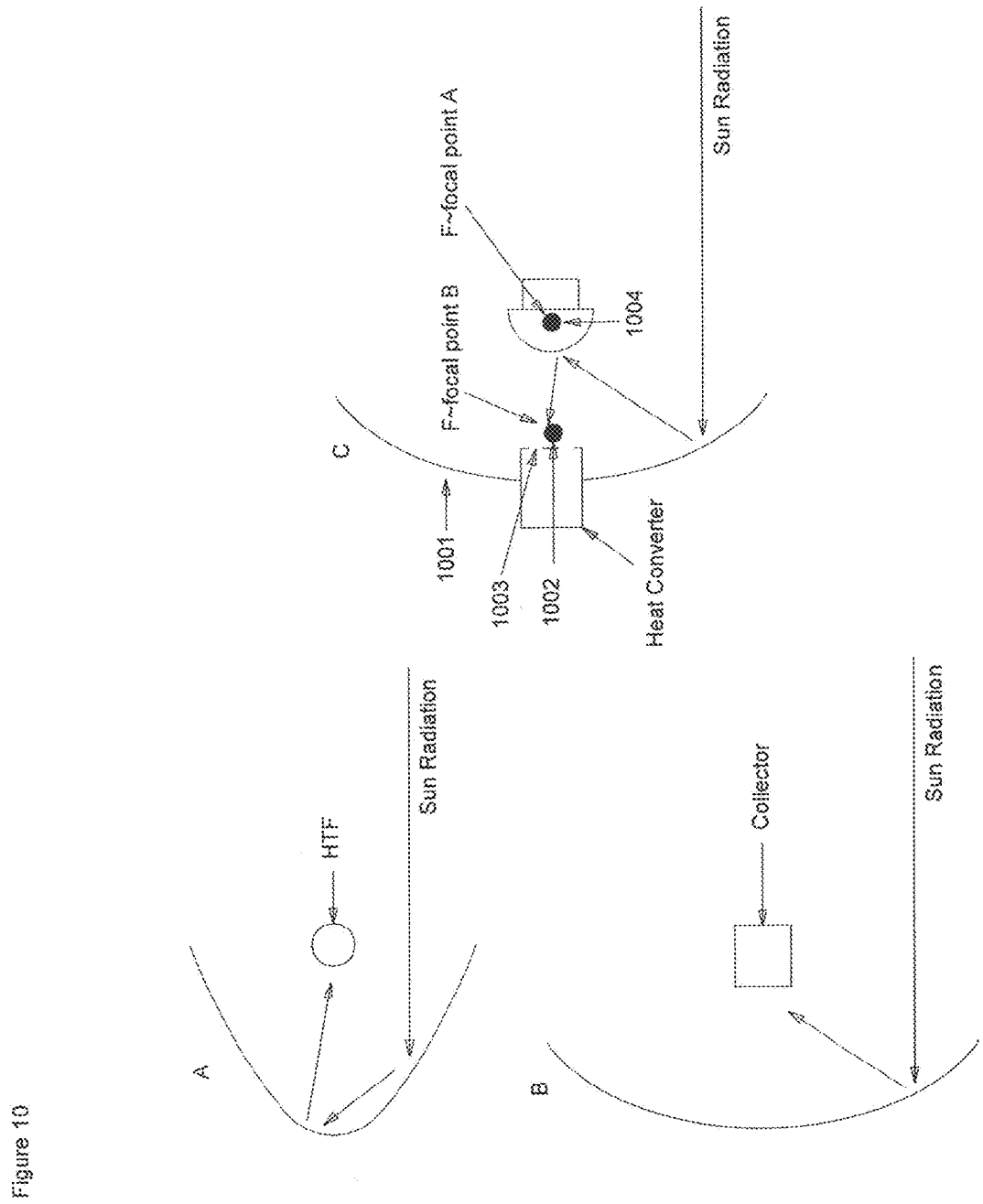
FIG. 10 shows prior art designs for parabolic trough, parabolic dish apparatus, and hyper parabolic concentrator.

Referring to FIGS. 5, 6, and 9, the vacuum chamber 160 includes upwardly extending rigid side walls 161. By the term side walls 161 is meant either a single wall forming the interior chamber or a plurality of walls 161 forming the interior chamber. Side walls 161 and heat sink 70 form an enclosure 164 in which a vacuum is provided to prevent any heat loss. Side walls 161 are produced from a reflective material, such as high quality borosilicate glass so that rays 78 converge towards the heat sink. Side walls 161 surround heat sink 70 and are spaced apart there from allowing the vacuum within chamber 164 to prevent heat loss.

Side walls 161 extend through dish 67 and are attached to the center of the main parabolic dish. Those portions of side walls 161 located above the dish are completely transmissive allowing not only direct focus sun rays to enter through the side walls but incident light to enter from the sides. The side walls 161 have inwardly facing reflective surfaces to reflect the incident light onto the surface of the heat sink. This assures that all available sunlight is directed and converted into heat energy.

Figure 7:
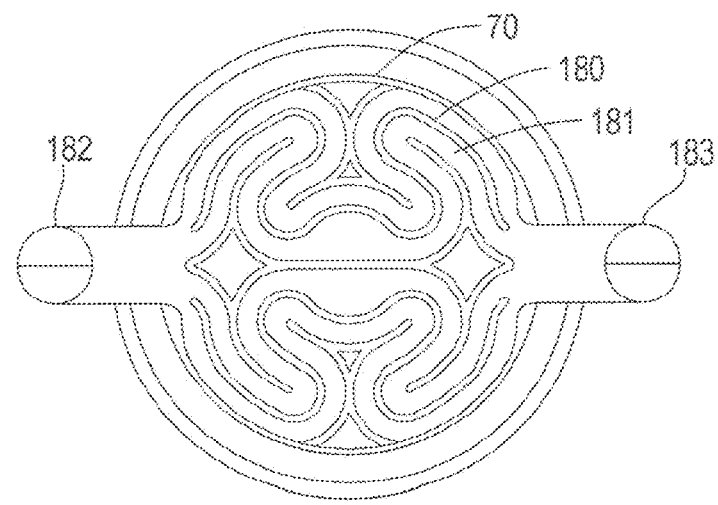
FIG. 7 is an enlarged cross-sectional view taken along a line and viewed in the direction of arrows 7-7 of FIG. 6 illustrating the heat sink.

Vacuum chamber 160 has a circular screw-on cap 162 produced from high quality borosilicate glass which is threaded onto side walls 161 with an Indium o-ring 202 positioned therebetween to insure the integrity of the vacuum. Side walls 161 form the chamber with a heat sink 70 located in the bottom portion of the chamber being entirely positioned therein. The internal heat sink 70 (FIG. 6) is a round disc, which is smaller in diameter than the inner diameter of the vacuum chamber. The heat sink is hollow with multiple interior heat sink fins 180 (FIG. 7). The fins are spaced apart from each other forming a confusing intricate network of passages or maze 181 within the interior of the heat sink through which the first heat transfer fluid from the first heat transfer fluid tube 39 (FIG. 1) enters via heat sink inlet 182. As shown in FIG. 7, the intricate network of passages defined by the fins increases the surface area of the heat sink and partially occludes the free flow of fluid once inside the heat sink, thereby allowing the heat from the solar radiation directed into the fins to be transferred to the first heat transfer fluid passing through the maze. A coupling 209 is provided on the bottom portion of chamber 160 which is connected to tube 39 directing the incoming fluid to heat sink 70. A second coupling 221 is provided in the bottom portion of chamber 160 which is connected to tube 44 receiving the fluid from the heat sink 70.

Chamber 160 is mounted to the dish 67 with one half of the chamber extending above the upper surface 195 (FIG. 6) of the dish and the remaining one half of the chamber extending below the dish. A reflective coating 197 (FIG. 9) on the interior surface of side wall 161 extends from the dish down through the lower half of the chamber and into a partial vacuum interior 208 at the bottom of the chamber. The coating 197 forms a corner coating 196 at each of the corners formed between the side walls and the bottom wall of interior 208 beneath the heat sink. Coating 197 prevents stray light from exiting the bottom of the chamber and will reflect the light back into the bottom and top of the heat sink. Such a coating is available from the 3M Company under the designation Solar Mirror Film 1100.

Chamber 160 extends below heat sink 70 forming a partial vacuum interior 208 in communication with a vacuum evacuator hose nozzle 210. In the embodiment of FIG. 1, three identical collector concentrators 61-63 with vacuum chambers and heat sinks are arranged in series so that the first heat transfer fluid heated by each heat sink successively adds heat to the first heat transfer fluid flowing through each sink. The heated first heat transfer fluid is then routed into boiler 80 to heat the second heat transfer fluid in the boiler.

Figure 13:
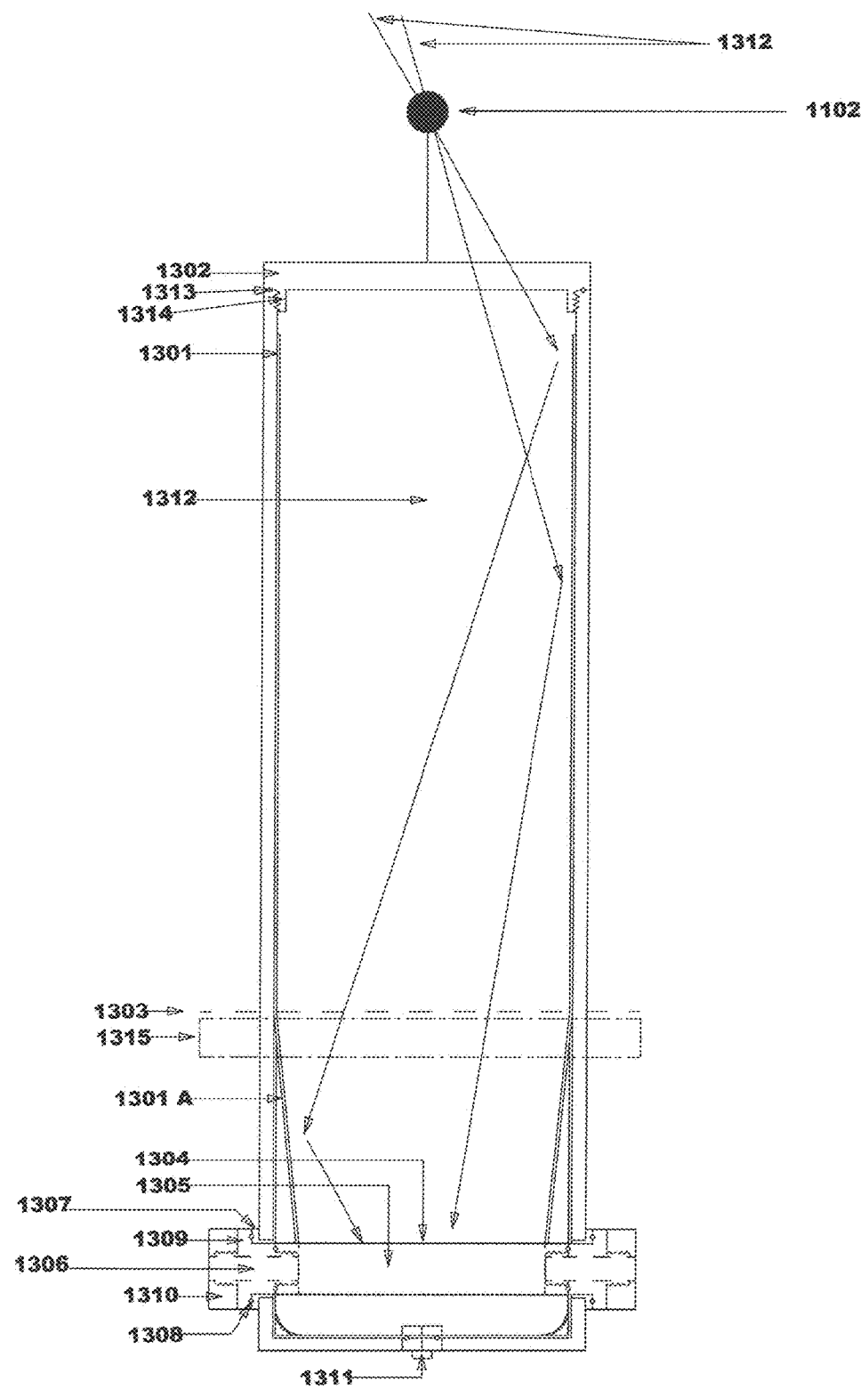
FIG. 13 is a vertical cutaway view of the sealed vacuum collection chamber and internal heat sink of the invention.

Referring to FIG. 13, in the embodiment having the forward-facing dual parabolic concentrator (FIG. 11), the vacuum chamber for receiving the concentrated solar radiation is elongated to match the changed focal point 1102 to maximize the collected solar energy. Solar rays directed from the forward facing dual parabolic concentrator are focused into the vacuum chamber without spillover losses. The inner reflective sheets 1301 reflect and direct incoming solar radiation 1312 to the main heat sink 1305 for transfer of solar radiation into heat for the heat transfer fluid (HTF) system. This novel design for the vacuum chamber heat sink allows matching of the new ringed focal point, increased efficiency and gain of the entire collection/concentration antennae apparatus.

Figure 8:
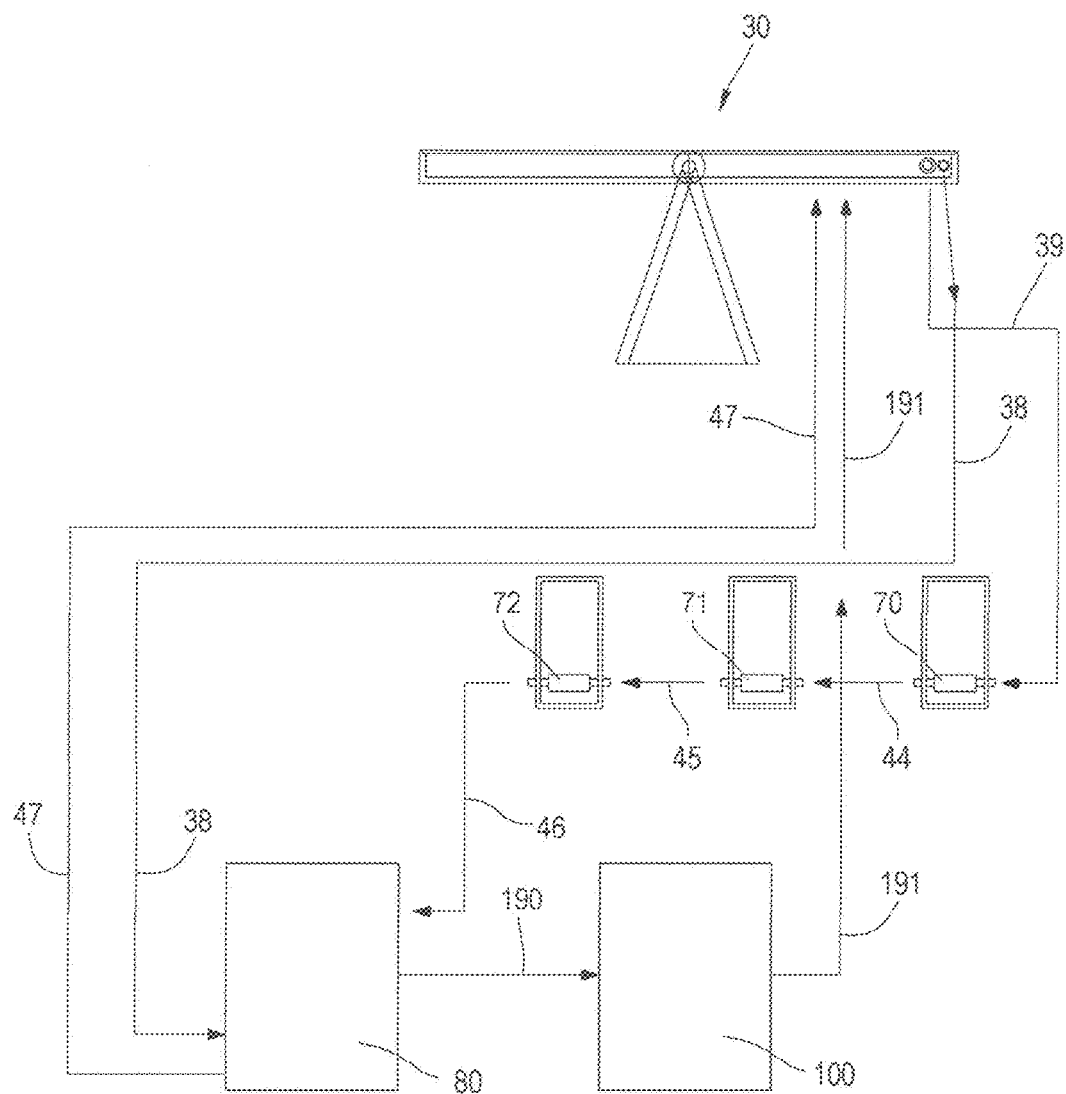
FIG. 8 is a flow diagram illustrating the flow of first heat transfer fluid and second heat transfer fluid between the major components of the solar power system of FIG. 1.

Referring to FIG. 8 there is shown a flow diagram of die solar power system. Preheated second heat transfer fluid flows outwardly from panel 30 via tube 38 directly to boiler 80 where it empties into the boiler. Pre-heated first heat transfer fluid flows outwardly from panel 30 via tube 39 to the inlet 182 (FIG. 7) of heat sink 70 of the first collector concentrator 61 where the first heat transfer fluid flows through the maze 181 of the heat sink while receiving heat from the heat sink and exiting via outlet 183. Conduit 44 is connected to outlet 183 routing the heated first heat transfer fluid to the inlet of the heat sink 71 of the second collector concentrator 62 where the first heat transfer fluid flows through the maze of the second heat sink 71 wherein additional heat is added to the first heat transfer fluid. The first heat transfer fluid exits the outlet of heat sink 71 which is connected to conduit 45. Conduit 45 is connected to the outlet of heat sink 71 and the inlet of heat sink 72 of the third collector concentrator 63. The first heat transfer fluid is routed through the maze of heat sink 72 where additional heat is added to the first heat transfer fluid. Conduit 46 is connected to the outlet of heat sink 72 and the inlet of a coil 184 (Fig.) of boiler 80 wherein the heat in the first heat transfer fluid flows from the coil to the second heat transfer fluid contained in the boiler.

In the preferred embodiment, water is used as the second heat transfer fluid preheated in panel 30 and directed via tube 38 to boiler 80 although it is understood that other flowable fluids may be utilized. Steam is created within the boiler and routed from the boiler 80 via conduit 190 to the inlet of a bladeless turbine 100 wherein the steam drives the discs of the turbine.

Figure 12:
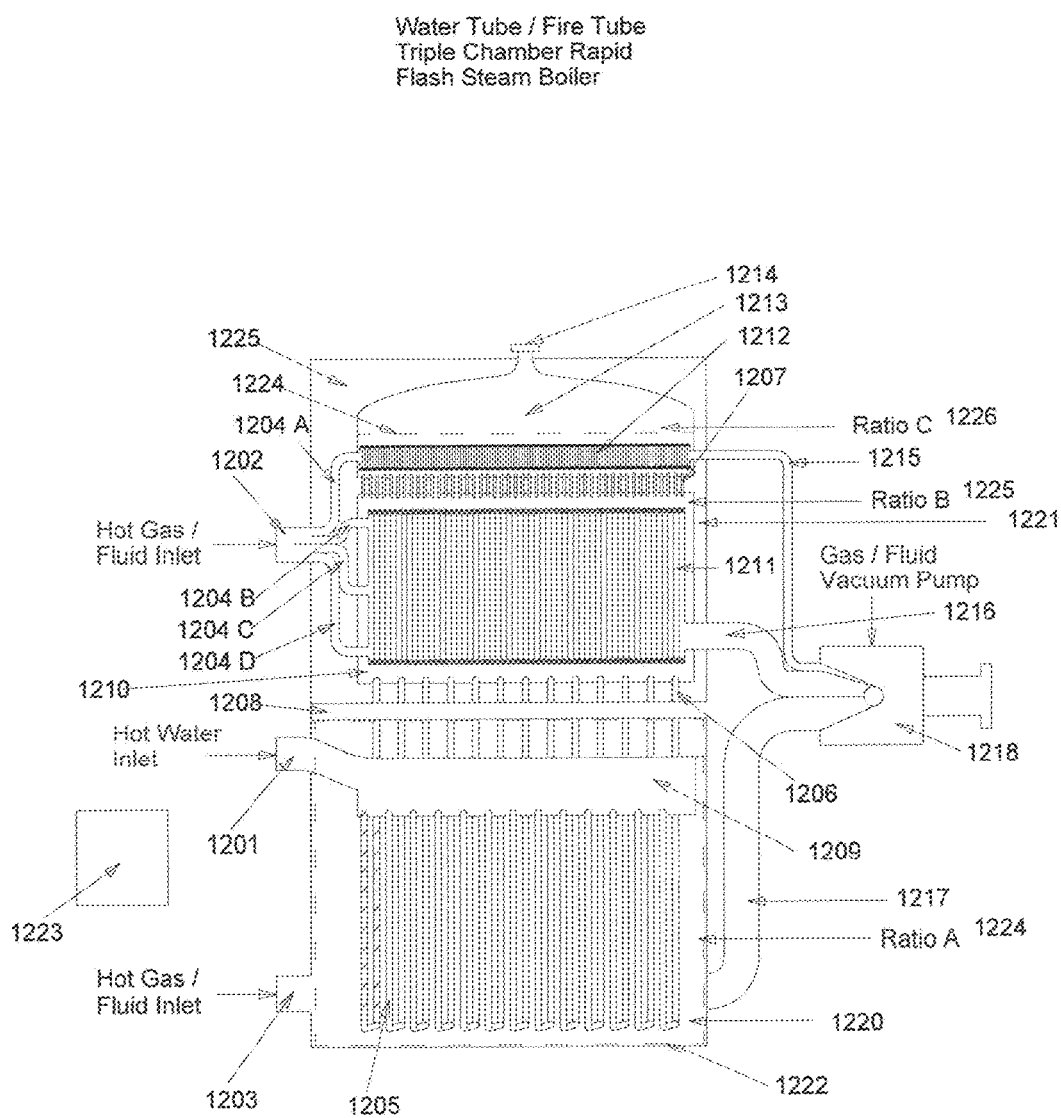
FIG. 12 is a vertical cutaway view of a water-tube fire-tube triple chamber rapid flash steam boiler.

In one embodiment, a water-tube fire-tube triple chamber rapid flash steam boiler yields higher temperatures and pressures for operating the turbine while reducing the time of the water-to-steam cycle. Referring to FIG. 12, the boiler is separated into three main chambers, water-tube 1224, fire-tube 1225 and fire-tube 1226 each chamber having incrementally increased water temperature and pressure from the prior chamber. The heated flowable fluid enters the boiler at inlets 1202 and 1203 and exits through outlets 1215, 1216 and 1217 all three converging into the fluid vacuum pump 1218, which then recirculates the fluid in a closed-loop system for reheating by the vacuum chamber heat sink array. Hot water enters the first chamber 1224 of the boiler 1201 and then begins to circulate into the water-tube chamber through a closed tube array 1205 down, around the base of the chamber and then up to the first fire-tube chamber 1225 through isolated section tubes 1206.

In chamber two 1225 the water gains both in temperature and pressure and finally enters chamber three 1226 through smaller sealed inter-chamber tubes 1207 where additional temperature and pressure increases to produce the desired saturated steam pressure needed to operate the system turbine (FIG. 15). The heated fluid is split between the three chambers 1224, 1225 and 1226 in a way that the heated fluid is free flowing in 1224 and circulates around the water tubes 1205 thus acting as a water-tube boiler. The heated fluid in chamber 1225 enters into a corrugated accordion style heat exchanger 1211 and acts as a fire-tube boiler stage. The heated fluid in 1226 enters into a micro corrugated accordion style heat exchanger 1212 and acts as a final fire-tube boiler stage to impart the needed energy and heat to produce the desired output steam pressure and hourly volume needed to run the system turbine. In the final chamber 1226 there is a thin aluminum sheet with perforated holes 1227, which inhibits rapid gas expansion and levels the vapor pressure of the pressurized water opposed to the steam vapor gas dome 1213. Final pressurized steam exits through controlled port 1214 and is directed into the adjoining turbine. The triple chamber design allows for a greater amount of water to pass through the boiler achieving higher temperatures and pressures in a decreased water to steam cycle.

Downstream from the boiler, the fluid from conduit 190 acts on the turbine discs imparting rotary motion to an axle upon which the discs are mounted. An Epicyclic Gearbox or Planetary Gearbox 120 may be used to step down the high turbine RPM for driving an alternator 192 to produce alternating current. Such gearboxes and alternators are well known in the industry. Bladeless turbines are known. For example, U.S. Pat. No. 1,061,206 discloses an example of a bladeless turbine.

In one embodiment, the system turbine is a bladeless turbine. In another embodiment, Applicant's new modular barrier layer (MBLT) or bladeless turbine is utilized with the power system. Referring to FIGS. 15-16, the MBLT may be expandable to meet higher pressure and temperature needs for future usage is shown. Heated fluid under pressure enters the MBLT at the inlet port 1604 and directly interacts with discs 1510 by means of adhesion and viscosity imparted to each disc's flat interior. The flowable fluid causes the internal discs to rotate around a central shaft 1502 which is fixed to each disc. The rotational torque energy imparted to the shaft in turn drives auxiliary generating apparatus, i.e., an alternator. The flowable fluid exits the MBLT through an external port 1507. An example of a four stage modular turbine is illustrated in FIG. 16. The design of the MBLT lends to ease of manufacturing, cost decreases, lower maintenance and the ability to work with many high pressure, high temperature, gas/fluid inputs and industrial exhaust gases.

The steam, in the case of water being used as the second heat transfer fluid in boiler 80, passes through turbine 100 and is converted to water which is then routed back via conduit 191 to the water tube 38 connected to the inlet of the panel preheating device 30 to continue the process. The first heat transfer fluid routed through the coil 184 of boiler 80 is routed back via conduit 47 to the first heat transfer fluid inlet tube 39 connected to the inlet of the panel preheating device 30 to continue the process.

With reference to FIG. 14, a heat capture noise reduction enclosure improves operating efficiencies of the turbine. The outer rigid shell 1401 is made of vacuum impregnated panel (VIP) material, which creates a solid outer shell for the enclosure. Inner thermal insulating foam 1402 provides for heat capture and reduces substantially heat loss for the turbine during operation. A double walled flexible metal mesh 1403 provides a barrier between the turbine (shown diagrammatically) and the inner thermal insulating foam 1402 to prevent abrasive deterioration of the foam inner structure caused by vibrational forces during turbine operation. Other known high heat and abrasion resistant materials may be used to produce the enclosure.

Many variations are contemplated and included in the present invention. For example, once the solar power system is operating at full power, the water circulated through the system can be switched from a closed loop system to provide hot water for commercial and residential usage. Hot water storage tanks (hot water heaters), interior floor tube heating, hot tubs, and swimming pools can be fed from the excess hot water. As described above, the system and its components are scalable for domestic and industrial applications.

Another use of the present invention is to power a desalination system by connecting a hydroturbine to the condenser of a steam turbine for the purpose of producing desalinated water. U.S. Pat. No. 8,341,961 is herewith incorporated by reference for showing how one such steam turbine is used to produce desalinated water. The system disclosed herein is particularly useful when at a predetermined time, nearing the end of the sunlight day, the system will again be switched to a closed loop arrangement but in a stagnate state gaining heat and storing it for the next days needed start-up temperature.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A heat concentrator device for a solar power system comprising:
    a hollow body having a bottom, a top and side walls connecting the bottom and the top to define an interior chamber;

an airtight cap secured to the top of the body; and a heat sink positioned within said chamber, said heat sink includes a disc-shaped body having a hollow interior with opposite side walls, an inlet port formed in one of the opposite side walls and an outlet port formed in the other for fluid to flow into and out of the heat sink, and spaced apart fins in the interior that define an intricate network of passages for partially occluding the free flow of fluid within the hollow interior of said heat sink.

2. The heat concentrator device of claim 1 in which the side walls of the chamber extend below the heat sink to form a partial vacuum chamber between the bottom of the hollow body and the heat sink.

3. The heat concentrator device of claim 1 in which a portion of the side walls of the chamber has reflective surfaces facing into the chamber.

4. A method of connecting a heat concentrator device to a reflective dish for a solar power system comprising the steps of:

providing a heat concentrator device, said heat concentrator device includes a hollow body having a bottom, a top and side walls connecting the bottom and the top to define an interior chamber, a portion of the sidewalls of the chamber has reflective surfaces facing into the chamber;

positioning a heat sink within said chamber, said heat sink having a hollow interior with opposite side walls, an inlet port formed in one of the opposite side walls and an outlet port formed in the other so that fluid can flow into and out of the heat sink;

providing a reflective dish with an upper surface, the dish is adapted to be capable of operably connecting to a solar power system; and mounting the heat concentrator device to the dish so that the portion of the side walls of the chamber having the inwardly facing reflective surfaces is below the upper surface of the dish and the remaining portion of the side walls of the chamber is above the surface of the dish.

5. The method of claim 4 in which the hollow interior of the heat sink has passageways forming an interior maze connecting the inlet and outlet ports.

6. The method of claim 5 further comprising the step of evacuating the interior chamber of the heat concentrator device and securing an airtight cap onto the top of the chamber.

7. The method of claim 4 in which the sidewalls of the chamber extend below the heat sink to form a partial vacuum chamber between the bottom of the hollow body and the heat sink.

8. The method of claim 4 further comprising the step of evacuating the interior chamber of the heat concentrator device and securing an airtight cap onto the top of the chamber.

9. A heat concentrator device for a solar power system comprising:

a hollow body having a bottom, a top and side walls connecting the bottom and the top to define an interior chamber;

an airtight cap secured to the top of the body;

a heat sink positioned within said chamber, said heat sink includes a disc-shaped body having a hollow interior with opposite side walls, an inlet port formed in one of the opposite side walls and an outlet port formed in the other for fluid to flow into and out of the heat sink, and spaced apart fins in the interior that define an intricate network of passages for partially occluding the free flow of fluid within the hollow interior of said heat sink; and a coupling for fluidly connecting the inlet and outlet ports of the heat sink to a fluid circulating system.

10. The heat concentrator device of claim 9 in which the interior chamber is under vacuum pressure and the sidewalls of the chamber extend below the heat sink to form a partial vacuum chamber between the bottom of the hollow body and the heat sink.

11. The heat concentrator device of claim 10 in which a portion of the sidewalls of the chamber has reflective surfaces facing into the chamber.

12. The heat concentrator device of claim 9 in which a portion of the sidewalls of the chamber has reflective surfaces facing into the chamber.

* * * * *